Patented Apr. 20, 1926.

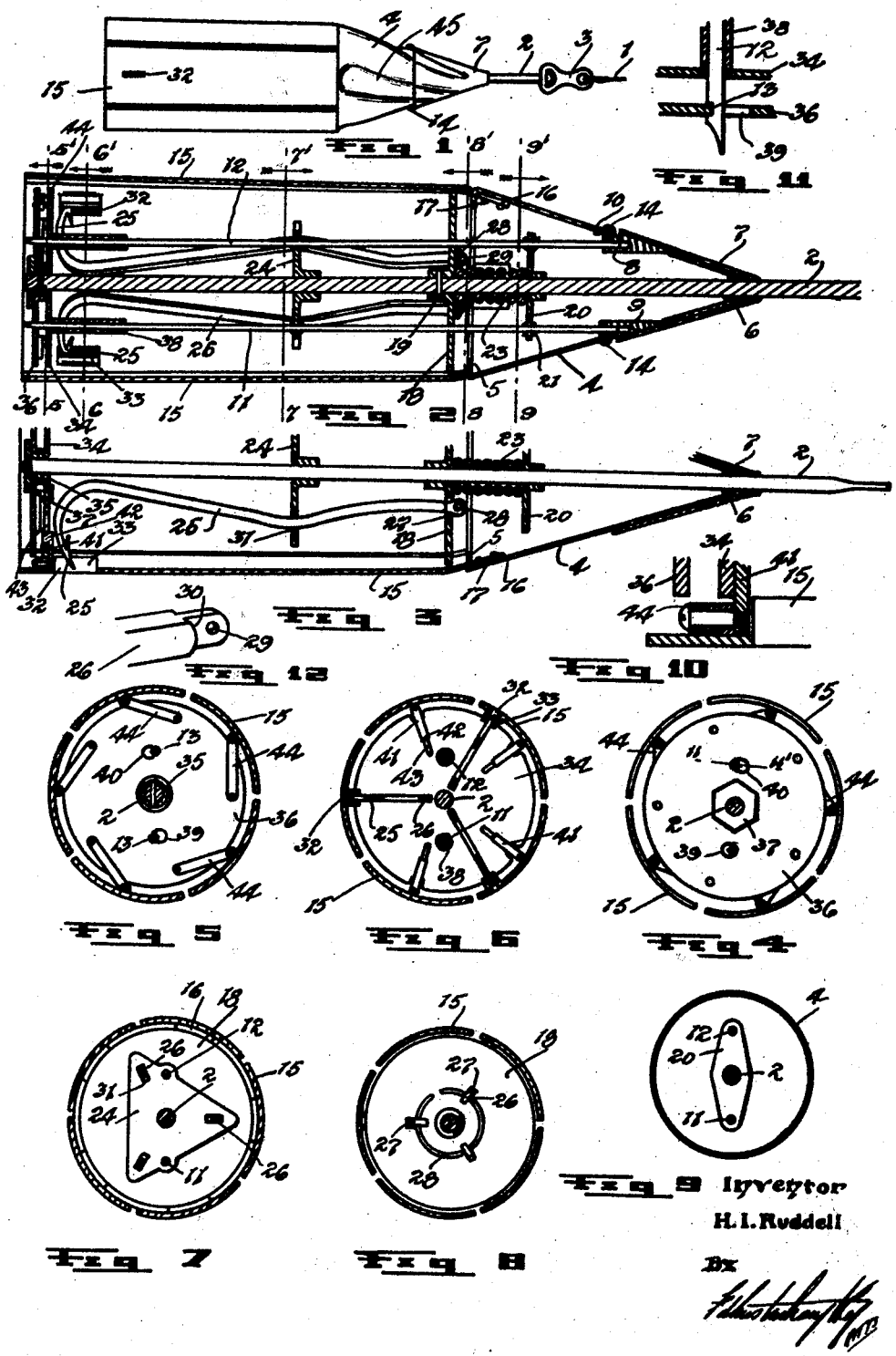

1,581,548

UNITED STATES PATENT OFFICE.

HARRY I. RUDDELL, OF WINNIPEG, MANITOBA, CANADA.

FISH BAIT.

Application filed December 4, 1924. Serial No. 753,934.

*To all whom it may concern:*

Be it known that I, HARRY I. RUDDELL, of the city of Winnipeg, in the Province of Manitoba, Canada, have invented certain new and useful Improvements in Fish Bait, of which the following is the specification.

The invention relates to improvements in fish bait and an object of the invention is to provide a mechanical fish bait embodying normally concealed fish hooks which are actuated by the biting fish and move out to catch in the mouth of the fish, such type of bait assuring of a positive hooking of the biting fish and also allowing of the bait to pass through weeds or engage with other obstructions without becoming caught as is customary where exposed fish hooks are employed.

A further object of the invention is to construct the device so that it will spin when in use and such that it can be readily dismounted for inspection or repair purposes.

With the above more important objects in view the invention consists essentially in the arrangement and construction of parts hereinafter more particularly described, reference being had to the accompanying drawing in which:

Fig. 1 is a side view of the bait.

Fig. 2 is an enlarged detailed vertical sectional view longitudinally through the same.

Fig. 3 is a horizontal sectional view longitudinally through approximately one half of the bait.

Fig. 4 is a rear end view of the bait.

Fig. 5 is a vertical sectional view at 5—5′ Figure 2 and looking in the direction of the applied arrow.

Fig. 6 is a vertical sectional view at 6—6′ Figure 2 and looking in the direction of the applied arrow.

Fig. 7 is a vertical sectional view at 7—7′ Figure 2 and looking in the direction of the applied arrow.

Fig. 8 is a vertical sectional view at 8—8′ Figure 2 and looking in the direction of the applied arrow.

Fig. 9 is a vertical sectional view at 9—9′ Figure 2 and looking in the direction of the applied arrow.

Fig. 10 is an enlarged detailed vertical sectional view showing the connection between the links and the pressure plates.

Fig. 11 is an enlarged detailed horizontal sectional view at 11—11′ Figure 4.

Fig. 12 is a perspective view of the forward end of one of the fish hook shanks.

In the drawing like characters of reference indicate corresponding parts in the several figures.

This bait will be pulled through the water at the end by a line 1 and its external appearance will be such that it will be attractive to fish. It comprises the parts now described in detail.

A central shaft 2 of pre-determined length is provided, this shaft having the forward end thereof swivelly connected by a swivel 3 to the line 1, the shaft being free to rotate without rotating the pulling line. To the forward end of the shaft I permanently secure a cone-shaped nose piece 4 which has the rear end thereof inturned to provide a rear flange 5. In the present instance the front end of the cone is fastened by soldering as indicated at 6 to the shaft. A cone shaped thimble 7 is slidably mounted on the shaft in advance of the nose piece and normally receives the forward end of the nose piece. This thimble is provided with a pair of internal diametrically opposed lugs 8 and 9 which normally pass through suitable slots 10 provided in the nose piece, the slots being of such dimension that they permit of the ready withdrawal of the lugs from the interior of the nose piece when the thimble is advanced.

To the lugs I fasten a pair of rearwardly extending parallel rods 11 and 12, the rods being at opposite sides of the shaft and having their rear ends terminating in catches 13. Jam screws 14 are provided for fastening the rods to the lugs and the heads of the jam screws are exposed so that they can be readily unscrewed by a suitable tool.

Concentrically around the shaft I group a plurality of similar pressure plates 15 which form a longitudinally split, cylindrically shaped body enclosing the rear part of the shaft and extending rearwardly from the rear end of the nose piece. The plates have their adjacent edges spaced a pre-determined distance apart and their forward ends are provided with forwardly extending tongues 16 which pass through the flange 5 and are suitably riveted as indicated at 17 to the nose piece.

The pressure plates and tongues are preferably formed from spring steel and this allows the rear ends of the pressure plates to be sprung inwardly, the tongues yielding adjacent the nose piece to accommodate the movement.

Within the forward end of the cylindrical body, so formed by the pressure plates, I locate a disc 18 which is permanently fastened by means of a pin 19 to the shaft. In advance of the disc and within the nose piece, I locate a further disc 20 which is slidably mounted on the shaft and is fastened to the rods 11 and 12 as by soldering as indicated at 21. A coiled spring 23 encircles the shaft and has the ends thereof engaging the discs. This spring is held normally compressed by the catches 13 in a manner later described, and upon the catches being released, the disc 20 moves ahead and in so doing, shifts the rods 11 and 12 ahead, as well as the thimble 7.

Rearwardly of the disc 18 I mount slidably on the shaft, a further disc 24 which is permanently fastened to the rods as by soldering and moves in unison with the disc 20 within the longitudinally split, cylindrical body, and grouped around the shaft I locate a plurality of similar, normally concealed fish hooks 25, these hooks having the prongs outturned and carried at the rear ends of similar shanks 26.

In the present instance I have shown three fish hooks and the forward ends of the fish hook shanks are pivotally connected to the disc 18, the pivotal connection being made, in the present instance, by slotting the latter disc as indicated at 27, passing the ends of the shanks through the slots and then threading a split ring 28 through eyes 29 provided in the ends of the shanks. The shanks are also shouldered as indicated at 30, to prevent forward end shifting of the shanks.

The shanks of the fish hooks pass slidably through suitable slots 31 provided in the disc 24 and here it will be observed that after passing through the latter disc, the shanks converge forwardly towards the shaft, with the result that any forward movement of the disc 24 will produce a quick outswinging of the pronged or barbed ends of the hooks.

Certain of the pressure plates are slotted as indicated at 32 to permit of the outward movement of the pronged ends of the hooks and the sides of the slots are provided with suitable inturned guides 33, guiding the hooks.

Rearwardly of the hooks and to the shaft I secure permanently, a further disc 34 which is provided with a comparatively short boss or hub 35 on which I rotatably mount the hub of a rear disc 36, the latter disc being held in place by a retaining nut 37, screw threaded on the end of the shaft.

The disc 34 carries inwardly extending guide tubes 38 which slidably receive the rear ends of the rods 11 and 12, and the catches 13 of the rods are adapted to catch, in the locked position thereof, in slots 39 and 40 provided in the rotary disc 36.

From the above arrangement, will be obvious that if the thimble be forced back, the spring will be compressed and the rods can be moved back to spring the catches thereof into engagement with the sides of the slots 39 and 40, thereby locking the spring in compression, and that when so locked, the hooks will be in their withdrawn concealed position as shown in the drawing.

Means are provided whereby an inward movement of any one of the pressure plates will effect the rotation of the disc 36 in a direction which will release the catches and in so doing release the spring and cause the forward shifting of the rods 11 and 12 and the consequent quick out throwing of the hooks. Such latter means is now described.

Each of the pressure plates is provided rearwardly with a guide arm 41 pivotally connected thereto and having the inner end thereof formed into a head 42 slidably mounted in a slot 43 formed in the disc 34 radial to the shaft. A link 44 is connected pivotally to the rear end of each pressure plate and is also pivotally connected to the disc 36, the arrangement of the links being such that in the inward movement of the rear end of any pressure plate, the link will cause a rotary movement of the disc 36 in a direction which will pass the slots 39 and 40 away from the catches. The forward end of the bait is given a number of shallow, spiralling indents 45 which, when the bait is pulled through the water, will cause the same to rotate.

In order that the device may be clearly understood, I will now describe the manner in which it works, assuming that it is pulled through the water by the line 1 and that the hooks are locked in the in or concealed position as shown in the drawing.

Upon a fish seeing and biting the bait, he will exert an inward pressure on one or more of the plates and naturally his mouth will envelope the rear end of the bait. The instant the plates are pressed inwardly, the catches 13 are released which frees the spring to cause the forward shifting of the rods which results in the forward movement of the disc 24 and the consequent quick outshooting, through the slots 32, of the pronged ends of the hooks. The fish hooks will embed themselves in the mouth of the fish and accordingly make an effective catch. The device is re-set by shoving the thimble 7 rearwardly to compress the spring and reset the catches.

I might remark that a fish, in biting, will exert a considerable pressure on the pressure plates, and the spring resistance offered to the inward pressing of the pressure plates will be gauged accordingly. On this account, a slight inward pressure, such as might be occasioned by the passage of the bait through weeds or by it passing or gliding over a submerged object, will not be sufficient to set it off and accordingly the fisherman will not be bothered by the hooks catching on weeds or other obstructions such as occurs where exposed hooks are used.

Whilst I have entered into a very detailed description of the various parts, still it will be understood that I do not desire to be limited to the precise construction shown, as the various parts could be readily modified without departing from the spirit of the invention as later pointed out in the appended claims.

In this latter connection I might remark that the normally concealed guarded fish hooks are, however, necessary, as is also a trigger mechanism actuated by the biting pressure of a fish to release the guarded hooks to impinge in the mouth of the fish.

What I claim as my invention is:—

1. In a fish bait, a central shaft, a plurality of fish hooks grouped around the shaft and having their forward ends pivoted to permit of the radial outswinging of the hooks, a member slidably mounted on the shaft and adapted when shifted in one direction to move the free ends of the fish hooks outwardly, a spring actuated, normally locked trigger mechanism retaining the sliding member in a position such that the fish hooks are grouped adjacent the shaft, a plurality of resilient pressure plates encasing the former parts and adapted to be impressed by the biting pressure of a fish and means actuated by the inward movement of any of the said plates to release the trigger mechanism to effect a simultaneous outward movement of the hooks through suitable openings provided in the pressure plates.

2. In a fish bait, a central shaft, a forwardly disposed nose piece permanently secured to the shaft, a plurality of lengthwise extending spaced pressure plates attached to the rear end of the nose piece and spaced from and grouped around the shaft, said pressure plates having their rear ends inwardly movable under the biting pressure of a fish, a plurality of fish hooks grouped around the shaft and having the shanks thereof forwardly pivoted, a controlling disc slidably mounted on the shaft and attached to the fish hooks and adapted, when moved in one direction, to project the fish hooks simultaneously outwardly through suitable openings provided in the pressure plates and when moved in the reverse direction to withdraw the fish hooks to a concealed position within the pressure plates, a normally locked spring actuated trigger mechanism associated with the controlling disc and a trigger release mechanism actuated by the inward movement of the pressure plates.

3. In a fish bait, a central shaft, a forwardly disposed nose piece permanently secured to the shaft, a plurality of lengthwise extending spaced pressure plates attached to the rear end of the nose piece and spaced from and grouped around the shaft, said pressure plates having their rear ends inwardly movable under the biting pressure of a fish, a plurality of fish hooks grouped around the shaft and having the shanks thereof forwardly pivoted, a controlling disc slidably mounted on the shaft and attached to the fish hooks and adapted when moved in one direction to project the fish hooks simultaneously outwardly through suitable openings provided in the pressure plates and when moved in the reverse direction to withdraw the fish hooks to a concealed position within the pressure plates, a rearwardly disposed disc permanently secured to the shaft, a plurality of control rods attached permanently to the control disc and having their rear ends passing slidably through the rear disc and provided with catches, a forward disc slidably mounted on the shaft within the nose piece and permanently secured to the rods, a compression spring engaging said latter disc, a disc rotatably mounted on the rear end of the shaft and provided with slots adapted to be engaged by the catches to lock the control disc in its rear position and the spring in compression and a connection between the rear end of each pressure plate and the rotating disc adapted to rotate the disc in the inward movement of the pressure plates and effect the release of the catches.

4. In a fish bait, a central shaft, a cone shaped nose piece permanently secured to the forward end of the shaft, a plurality of spaced, rearwardly extending pressure plates grouped around the shaft and having their forward ends resiliently connected to the nose piece to permit of the inward restrained swinging movement of the rear ends of the said plates, a plurality of fish hooks grouped around the shaft and having the forward ends of the shanks thereof pivotally mounted to permit of a radial outswinging movement of the fish hooks, a control disc slidably mounted on the shaft and slidably receiving the shanks of the fish hooks and designed in moving forwardly, from its rear position, to project the fish hooks simultaneously outwardly through suitable openings provided in the pressure plates, a forward disc housed within the nose piece and slidably mounted on the shaft, a rearward disc permanently secured to the shaft, a plurality of rods secured permanently to the forward disc and the control disc and passing slidably through the rear disc and having their rear ends provided with catches, a rotary disc rotatably mounted on the rear end of the shaft and provided with suitable locking openings adapted to be engaged by the catches in the rear position of the control disc, a spring engaging the front disc, said spring being in compression in the locked position of the catches, connections between the rear ends of the pressure plates and the rotary disc adapted in the in movement of one of the pressure plates to rotate said disc and release the catches and a cone shaped thimble in advance of the nose piece and secured to the forward ends of the rods, said thimble being free of the shaft.

Signed at Winnipeg, this 6th day of June 1924.

HARRY I. RUDDELL.